US008590986B2

(12) United States Patent
Kim et al.

(10) Patent No.: US 8,590,986 B2
(45) Date of Patent: Nov. 26, 2013

(54) ENDLESS TRACK FOR A WORK VEHICLE

(75) Inventors: Geuk Bae Kim, Daedeok-gu (KR); Hugues Lajoie, Yusung-gu (KR)

(73) Assignee: Camoplast Solideal Inc., Sherbrooke (CA)

( * ) Notice: Subject to any disclaimer, the term of this patent is extended or adjusted under 35 U.S.C. 154(b) by 0 days.

(21) Appl. No.: 12/471,328

(22) Filed: May 22, 2009

(65) Prior Publication Data

US 2010/0295367 A1 Nov. 25, 2010

(51) Int. Cl.
*B62D 55/253* (2006.01)

(52) U.S. Cl.
USPC .................. 305/171; 305/176; 305/177

(58) Field of Classification Search
USPC ......... 305/157, 165, 167, 169, 170, 171, 173, 305/176, 177
See application file for complete search history.

(56) References Cited

U.S. PATENT DOCUMENTS

| 5,131,728 | A | 7/1992 | Katoh | |
|---|---|---|---|---|
| 6,471,307 | B2 * | 10/2002 | Watanabe et al. | 305/193 |
| 7,425,044 | B2 | 9/2008 | Soucy | |
| 2004/0222697 | A1 * | 11/2004 | Soucy et al. | 305/165 |

FOREIGN PATENT DOCUMENTS

| EP | 0 497 597 | B1 | | 8/1992 |
|---|---|---|---|---|
| JP | 06001272 | A | * | 1/1994 |
| JP | 06298137 | A | * | 10/1994 |
| JP | 10-7041 | A | | 1/1998 |
| JP | 10007041 | A | * | 1/1998 |
| JP | 2009061859 | A | * | 3/2009 |
| JP | 2009067241 | A | * | 4/2009 |
| KR | 10-2007-0089354 | A | | 8/2007 |
| KR | 2007089354 | A | * | 8/2007 |

OTHER PUBLICATIONS

Machine Translation of JP 06001272 A.*
Machine Translation of JP 2009061859A.*
Machine Translation of JP 2009067241A.*
Machine Translation of JP 10007041A.*
"Stay on the Right Track: Rubber Tracks for Track Loaders," Bridgestone Industrial Products America, Inc., 2009, 6 pages.

* cited by examiner

*Primary Examiner* — Kip T Kotter
(74) *Attorney, Agent, or Firm* — Christensen O'Connor Johnson Kindness PLLC (57) ABSTRACT

An endless track for traction of a work vehicle. The endless track comprises a body of elastomeric material and a plurality of cores at least partially embedded in the elastomeric material. Each core comprises a pair of wings extending transversally to a longitudinal axis of the endless track, and a wheel guide comprising at least one guide projection projecting on an inner side of the endless track. Each guide projection comprises a top end and a wheel-facing side for facing wheels of the work vehicle, such as roller wheels that roll on the inner side of the endless track. The wheel-facing side comprises a recess to impede passage of grit between the wheel-facing side and a portion of the elastomeric material in the recess. This can enhance a wear resistance of the endless track.

78 Claims, 11 Drawing Sheets

ENDLESS TRACK FOR A WORK VEHICLE

FIELD OF INVENTION

The invention relates to endless tracks for work vehicles, such as construction vehicles, agricultural vehicles, forestry vehicles, and other vehicles designed for other types of work in off-road conditions.

BACKGROUND

Work vehicles, such as construction vehicles (e.g., bulldozers, loaders, backhoe loaders, excavators, etc.), agricultural vehicles (e.g., harvesters, combines, tractors, etc.) and forestry vehicles (e.g., feller-bunchers, tree chippers, knuckleboom loaders, etc.), are often equipped with endless tracks which enhance their traction and reduce pressure they apply on soft, low friction and/or uneven grounds (e.g., soil, mud, sand, ice, snow, etc.) on which they operate.

One type of endless track comprises a body of elastomeric material (e.g., rubber) in which are embedded rigid cores (e.g., metallic cores) that extend transversally to impart transverse rigidity to the track and that guide wheels of the work vehicle that rotate in an inner area of the track.

In this type of endless track, the wheels of the work vehicle typically induce wearing of the track's elastomeric material. For example, roller wheels of the work vehicle that roll on the track's inner side normally tend to cause rapid wearing of the elastomeric material in a zone where they roll. Such wear of the elastomeric material often results in fissures between the elastomeric material and the cores, particularly at locations where the roller wheels engage the cores and the elastomeric material. As they continue to roll on the track's inner side, the roller wheels tend to push rocks, sand, water and/or other undesirable matter between the cores and the elastomeric material through the fissures, which become increasingly larger. Over time, this contributes to a progressive loss of adhesion between the cores and the elastomeric material which can lead to the cores being poorly retained in or even removed from the track.

For these and other reasons, there is a need to improve wear resistance of endless tracks having embedded cores.

SUMMARY OF INVENTION

According to a first broad aspect, the invention provides an endless track for traction of a work vehicle. The endless track comprises a body of elastomeric material and a plurality of cores at least partially embedded in the elastomeric material. Each core comprises a pair of wings extending transversally to a longitudinal axis of the endless track, and a wheel guide comprising at least one guide projection projecting on an inner side of the endless track. Each guide projection comprises a top end and a wheel-facing side for facing wheels of the work vehicle. The wheel-facing side comprises a recess to impede passage of grit between the wheel-facing side and a portion of the elastomeric material in the recess.

According to a second broad aspect, the invention provides a core for an endless track for traction of a work vehicle. The endless track comprises a body of elastomeric material. The core is at least partially embeddable in the elastomeric material. The core comprises a pair of wings extending transversally to a longitudinal axis of the endless track when the core is in the endless track, and a wheel guide comprising at least one guide projection projecting on an inner side of the endless track when the core is in the endless track. Each guide projection comprises a top end and a wheel-facing side for facing wheels of the work vehicle. The wheel-facing side comprises a recess to impede passage of grit between the wheel-facing side and a portion of the elastomeric material in the recess when the core is in the endless track.

According to a third broad aspect, the invention provides an endless track for traction of a work vehicle. The endless track comprises a body of elastomeric material and a plurality of cores at least partially embedded in the elastomeric material. Each core comprises a pair of wings extending transversally to a longitudinal axis of the endless track, and a wheel guide comprising at least one guide projection projecting on an inner side of the endless track. Each guide projection comprises a top end and a wheel-facing side for facing roller wheels of the work vehicle that roll on the inner side of the endless track. The wheel-facing side comprises a wheel-contacting surface for contacting the roller wheels and a sealing surface receding inwardly from the wheel-contacting surface to impede passage of grit between the sealing surface and a portion of the elastomeric material adjoining the sealing surface.

According to a fourth broad aspect, the invention provides an endless track for traction of a work vehicle. The endless track comprises a body of elastomeric material and a plurality of cores at least partially embedded in the elastomeric material. Each core comprises a pair of wings extending transversally to a longitudinal axis of the endless track, each wing comprising a top surface oriented towards an inner side of the endless track. Each core also comprises a wheel guide comprising at least one guide projection projecting on the inner side of the endless track. Each guide projection comprises a top end and a wheel-facing side for facing roller wheels of the work vehicle that roll on the inner side of the endless track. The wheel-facing side comprises a protrusion for contacting the roller wheels, the protrusion having a bottom edge vertically spaced from the top surface of each wing.

According to a fifth broad aspect, the invention provides a method for reducing wear of an endless track for traction of a work vehicle. The method comprises providing the endless track with a body of elastomeric material and a plurality of cores at least partially embedded in the elastomeric material. Each core comprises a pair of wings extending transversally to a longitudinal axis of the endless track, and a wheel guide comprising at least one guide projection projecting on an inner side of the endless track. Each guide projection comprises a top end and a wheel-facing side for facing wheels of the work vehicle. The wheel-facing side comprises a wheel-contacting surface for contacting the wheels and a sealing surface receding inwardly from the wheel-contacting surface. The method also comprises moving the work vehicle such that the wheels induce wear of some of the elastomeric material, wherein, for each guide projection, the sealing surface impedes passage of grit between the sealing surface and a portion of the elastomeric material adjoining the sealing surface.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
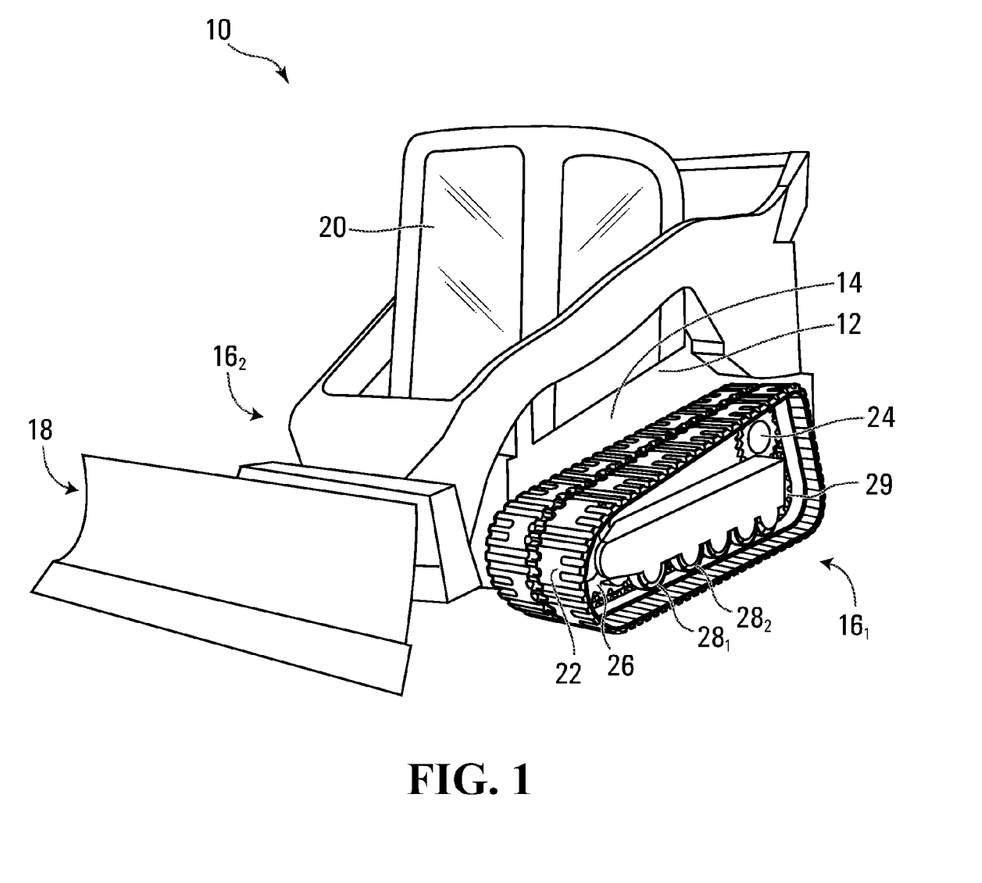
FIG. 1 shows a work vehicle in accordance with an embodiment of the invention.

FIG. 1 shows a work vehicle 10 in accordance with an embodiment of the invention. In this embodiment, the work vehicle 10 is a construction vehicle designed to perform construction work. More specifically, in this example, the construction vehicle 10 is a loader. In other examples, the construction vehicle 10 may be a bulldozer, a backhoe loader, an excavator, or any other type of construction vehicle.

The construction vehicle 10 comprises a frame 12 supporting a prime mover 14, a pair of track assemblies $16_1$, $16_2$, a working implement 18, and an operator cabin 20, which enable an operator to move the construction vehicle 10 on the ground and perform construction work.

The prime mover 14 provides motive power to move the construction vehicle 10. For example, the prime mover 14 may comprise an internal combustion engine and/or one or more other types of motors (e.g., electric motors, etc.) for generating motive power to move the construction vehicle 10. The prime mover 14 is in a driving relationship with each of the track assemblies $16_1$, $16_2$ that is connected to the prime mover 14 either directly or indirectly via a power train or other power transmission mechanism of the construction vehicle 10.

The operator cabin 20 is where the operator sits and controls the construction vehicle 10. More particularly, the operator cabin 20 comprises a set of controls that allow the operator to steer the construction vehicle 10 on the ground and perform construction work using the working implement 18.

The working implement 18 is used to perform construction work. In this embodiment where the construction vehicle 10 is a loader, the working implement 18 is a dozer blade that can be used to push objects and shove soil, debris or other material. In other embodiments, depending on the type of construction vehicle, the working implement 18 may take on various other forms, such as a backhoe, a bucket, a fork, a grapple, a scraper pan, an auger, a saw, a ripper, a material handling arm, or any other type of construction working implement.

The track assemblies $16_1$, $16_2$ are drivable by the prime mover 14 to propel the construction vehicle 10 on the ground. With additional reference to FIG. 2, in this embodiment, each track assembly $16_i$ (i=1 or 2) comprises an endless track 22 disposed around a drive wheel 24, a front idler wheel 26, a rear idler wheel 29, and a plurality of roller wheels $28_1$-$28_{10}$.

Figure 2:
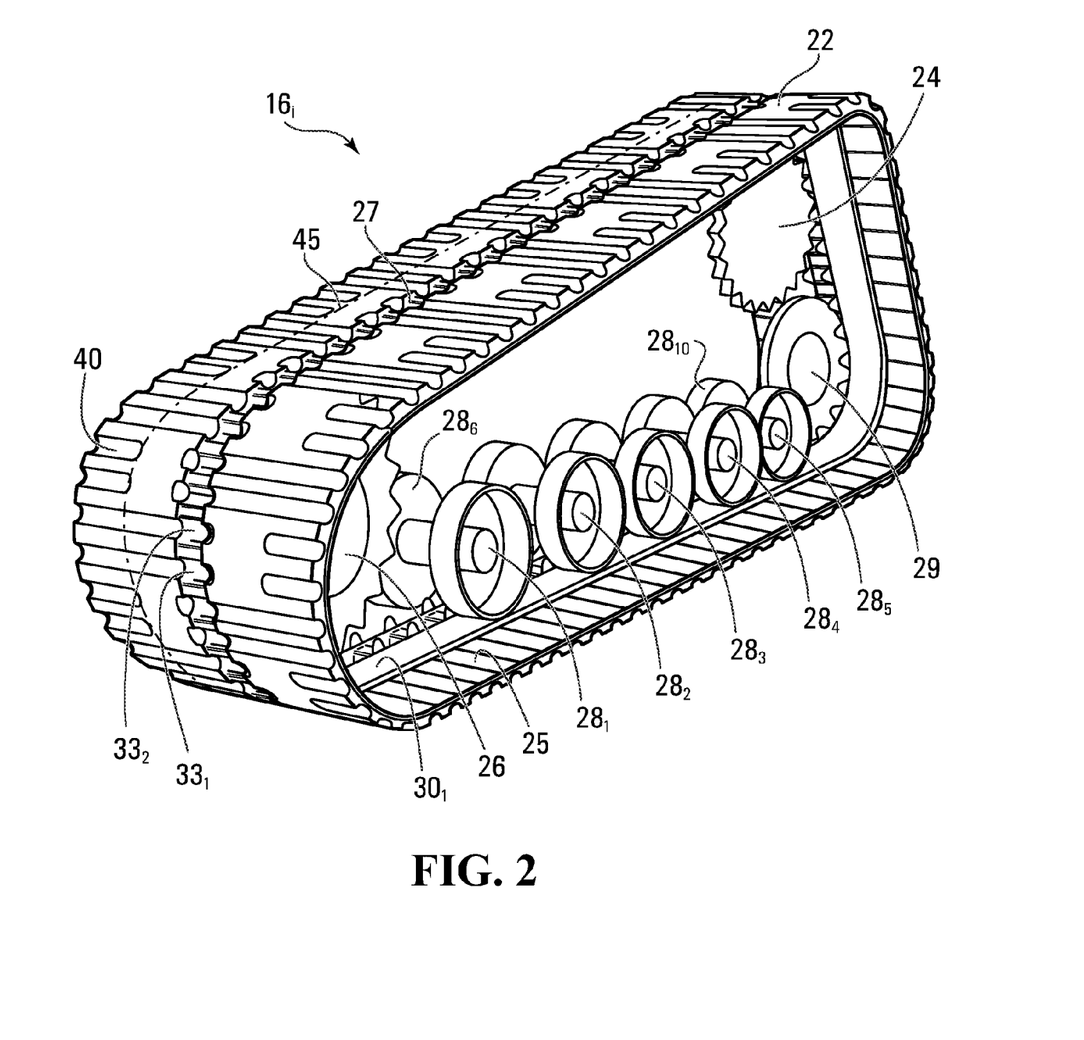
FIG. 2 shows a track assembly of the work vehicle.

The drive wheel 24 is operative for driving the endless track 22 to propel the construction vehicle 10 on the ground. When driven by the drive wheel 24, the endless track 22 moves along an endless path around the wheels 24, 26, 29, $28_1$-$28_{10}$.

The idler wheels 26, 29 and the roller wheels $28_1$-$28_{10}$ do not convert power supplied by the prime mover 14 to motive force, but rather guide the endless track 22 and/or maintain it under tension as it is driven by the drive wheel 24. Also, the roller wheels $28_1$-$28_{10}$ support and distribute part of the weight of the construction vehicle 10 on the ground via the endless track 22. As the endless track 22 is driven by the drive wheel 24, the roller wheels $28_1$-$28_{10}$ roll on a lower run of the endless track 22 to apply it on the ground for traction.

The track assembly $16_i$ may be configured in various other ways in other embodiments. For example, in some embodiments, the track assembly $16_i$ may comprise a front drive wheel (e.g., the front idler wheel 26 may be replaced by a drive wheel) instead of or in addition to the drive wheel 24. As another example, in some embodiments, the track assembly $16_i$ may comprise more or less roller wheels such as the roller wheels $28_1$-$28_{10}$. As yet another example, rather than have a generally triangular configuration as in this embodiment, in some embodiments, the track assembly $16_i$ may have various other configurations (e.g., a generally oblong configuration).

The endless track 22 provides traction to the construction vehicle 10 on the ground. The endless track 22 comprises an inner side 25 facing the wheels 24, 26, 29, $28_1$-$28_{10}$ and defining an inner area of the endless track 22 in which these wheels rotate. The endless track 22 also comprises a ground-engaging outer side 27 engaging the ground on which the construction vehicle 10 travels and comprising a tread pattern 40 to enhance traction of the construction vehicle 10 on the ground.

Motion of the endless track 22 is imparted by the drive wheel 24. In this embodiment, the drive wheel 24 is a drive sprocket and the endless track 22 has a plurality of openings $33_1$-$33_N$ which cooperate with teeth of the drive wheel 24 in order to drive the endless track 22. The endless track 22 may interact with the drive wheel 24 in other ways in other embodiments to be moved in its endless path. For example, in some embodiments, the inner side 25 of the endless track 22 may comprise a plurality of drive lugs that interact with the drive wheel 24 in order to cause the endless track 22 to be driven, or may frictionally engage the drive wheel 24 to cause the endless track 22 to be frictionally driven.

As the endless track 22 is driven by the drive wheel 24, the roller wheels $28_1$-$28_{10}$ roll on the inner side 25 of a lower run of the endless track 22 to apply it on the ground. More particularly, the roller wheels $28_1$-$28_{10}$ respectively roll on rolling surfaces $30_1$, $30_2$ of the inner side 25 of the endless track 22.

With additional reference to FIGS. 3 to 10, in this embodiment, the endless track 22 comprises a body of elastomeric material 42, a plurality of cores $44_1$-$44_N$ at least partially embedded in the elastomeric material 42, and a layer of longitudinal cables 31 embedded in the elastomeric material 42. The endless track 22 may comprise one or more additional components, such as, for instance, one or more layers of reinforcing fabrics embedded in the elastomeric material 42.

Figure 3:
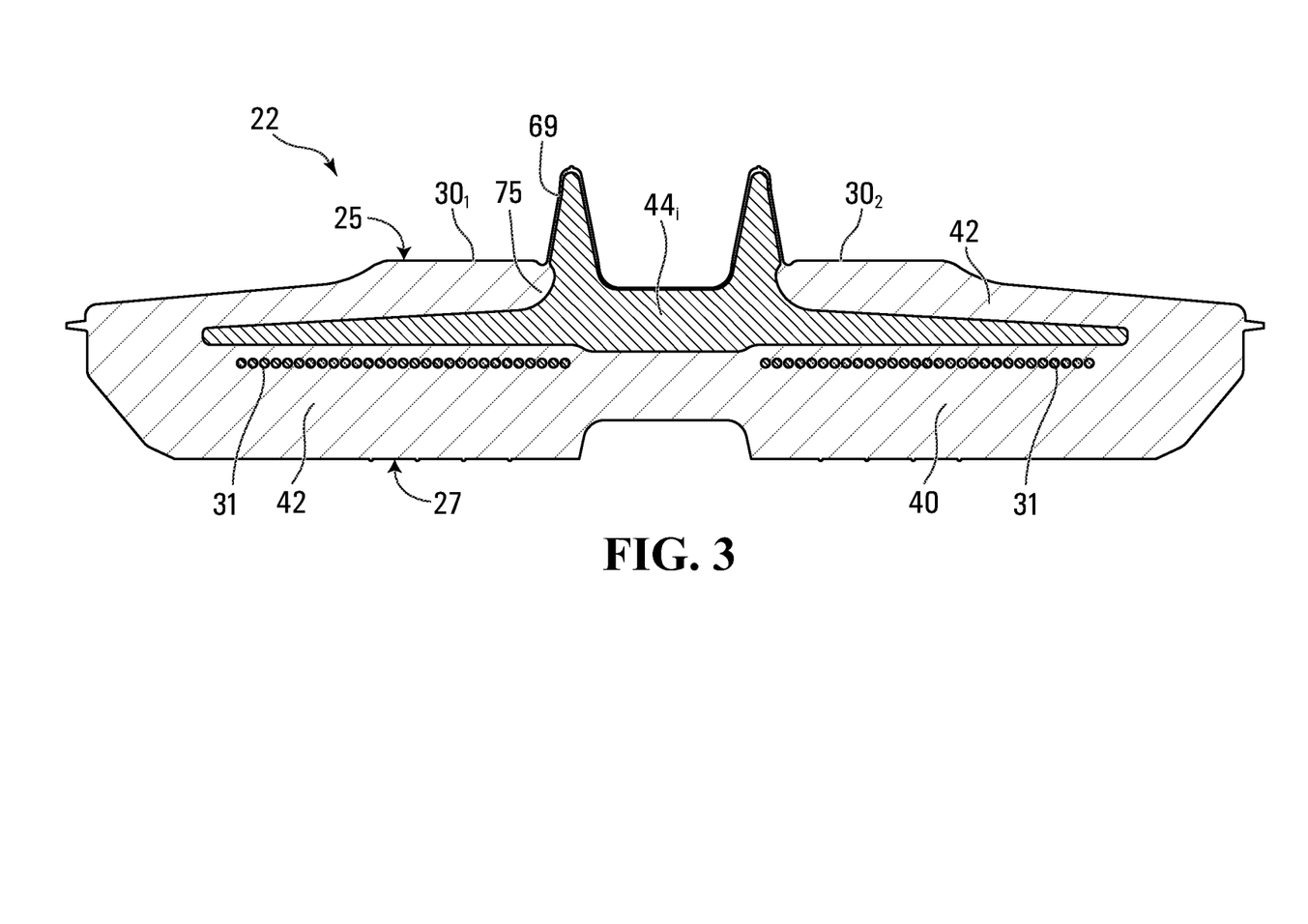
FIG. 3 shows a cross-sectional view of an endless track of the track assembly.
Figure 4:
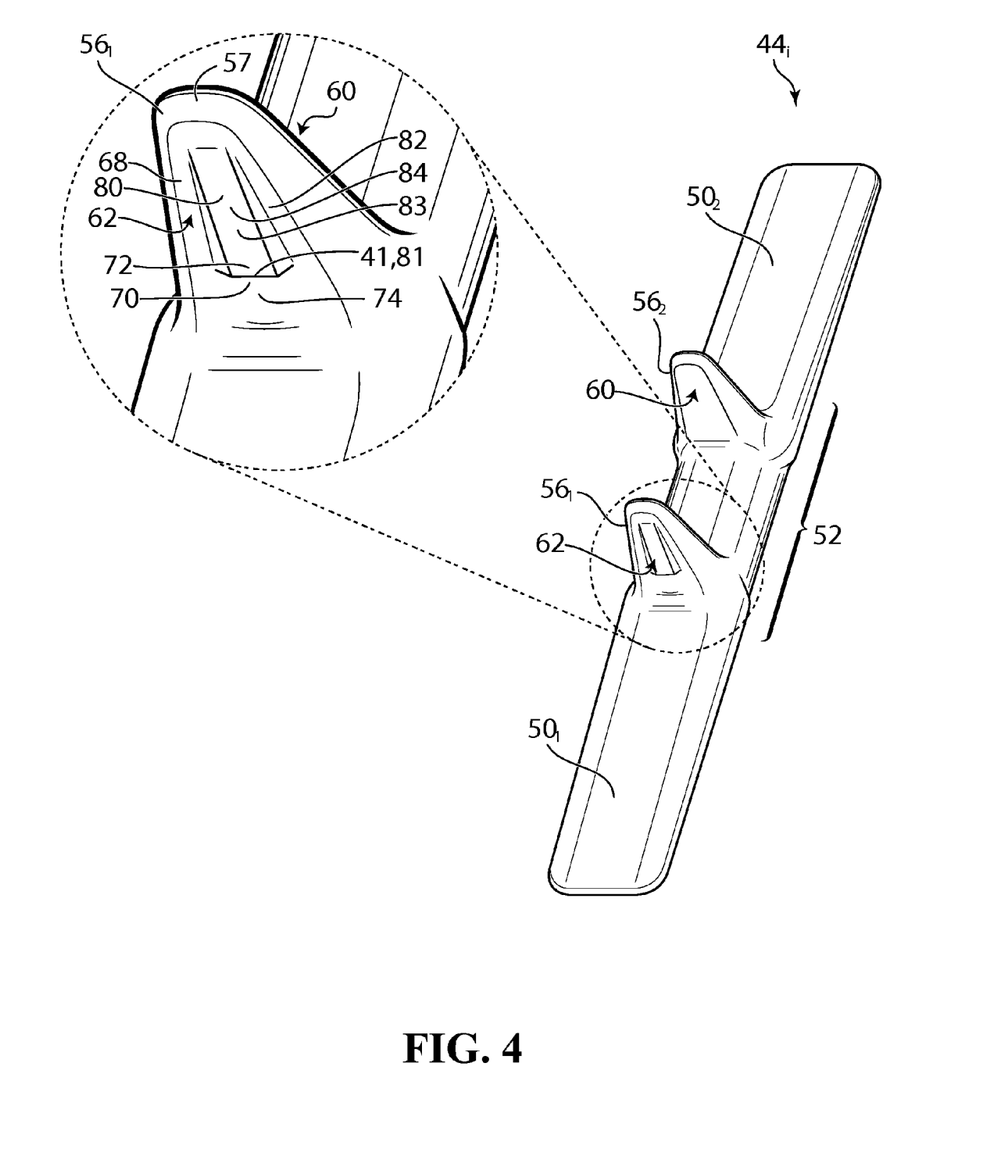
FIGS. 4 to 7 respectively show perspective, front, top, and side views of a core embedded in a body of elastomeric material of the endless track.
Figure 5:
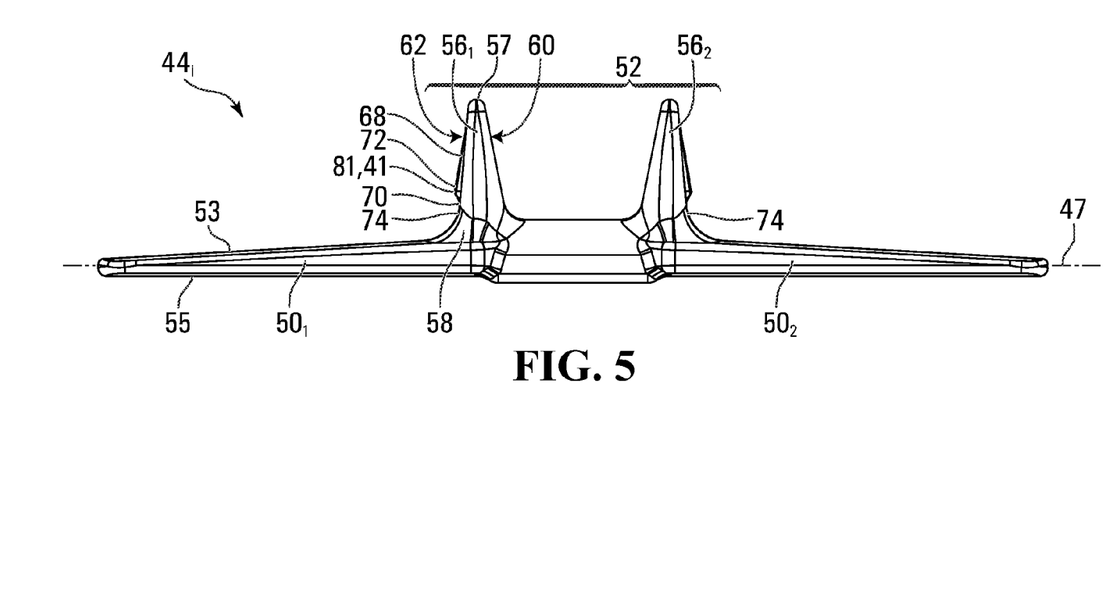
Figure 6:
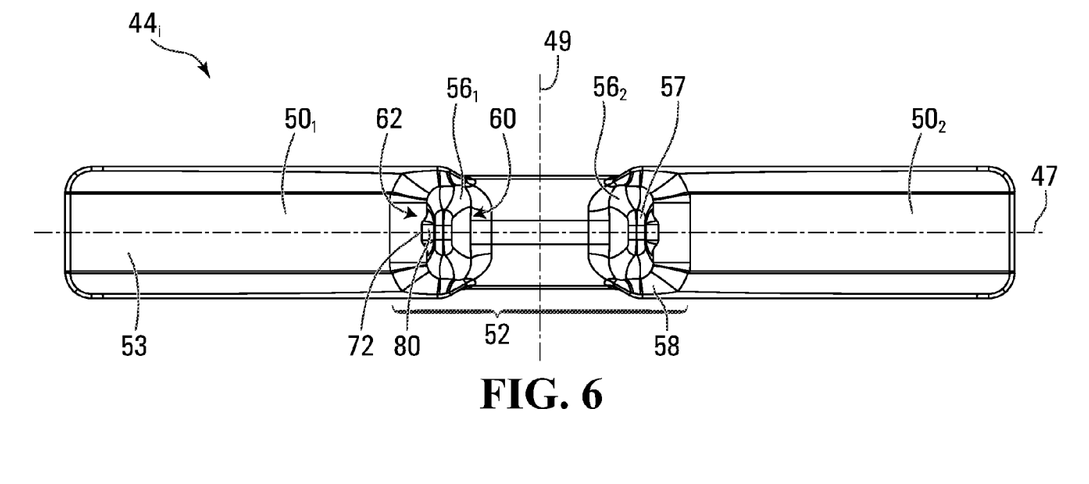
Figure 7:
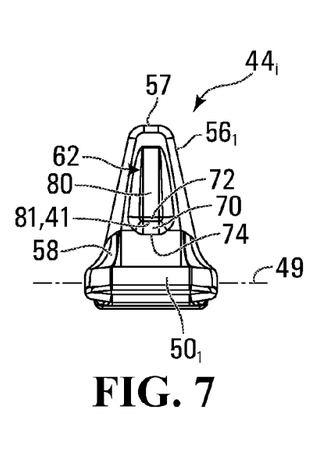

The elastomeric material 42 allows the endless track 22 to elastically change in shape as it is driven by the drive wheel 24 in its endless path around the wheels 24, 26, 29, $28_1$-$28_{10}$. In this embodiment, the elastomeric material 42 includes rubber. Various rubber compounds may be used. In some cases, different rubber compounds may be present in different areas of the endless track 22. The elastomeric material 42 may also include one or more other substances in addition to the rubber.

In other embodiments, the elastomeric material 42 may include other elastic substances resembling rubber.

The layer of longitudinal cables 31 enhances strength in tension of the endless track 22 along a direction generally parallel to a longitudinal axis 45 of the endless track 22. In this embodiment, the layer of longitudinal cables 31 comprises a plurality of steel cords adjacent to one another and extending generally parallel to the longitudinal axis 45 of the endless track 22. Other types of cables (e.g., made of other metallic or composite materials) may be used in other embodiments.

The cores $44_1$-$44_N$ are distributed along and extend transversely to the longitudinal axis 45 of the endless track 22 to impart transverse rigidity to the endless track 22. The cores $44_1$-$44_N$ also implement wheel guides to guide some of the wheels 24, 26, 29, $28_1$-$28_{10}$ as the endless track 22 is driven by the drive wheel 24.

More particularly, each core $44_i$ ($1 \leq i \leq N$) comprises a pair of wings $50_1$, $50_2$ and a wheel guide 52. In this embodiment, the core $44_i$, including the wings $50_1$, $50_2$ and the wheel guide 52, is made of metal (e.g., steel) formed into shape by casting. The core $44_i$ may comprise various other components, may be made of various other strong materials, and/or may be made using various other processes (e.g., forging, welding, fastening, etc.) in other embodiments.

The wings $50_1$, $50_2$ extend along a longitudinal axis 47 of the core $44_i$, which is transverse to the longitudinal axis 45 of the endless track 22, to impart transverse rigidity to the endless track 22. Each of the wings $50_1$, $50_2$ has a top surface 53 oriented towards the inner side 25 of the endless track 22 and a bottom surface 55 oriented towards the ground-engaging outer side 27 of the endless track 22. In this embodiment, each of the wings $50_1$, $50_2$ has a tapered shape whereby its top surface 53 converges longitudinally outwardly towards its bottom surface 55. The wings $50_1$, $50_2$ may have various other shapes in other embodiments.

The wheel guide 52 serves to guide some of the wheels 24, 26, 29, $28_1$-$28_{10}$ as the endless track 22 is driven by the drive wheel 24 to move the construction vehicle 10. As further discussed below, the wheel guide 52 is designed to enhance a wear resistance of the endless track 22, particularly its resistance to wear due to the roller wheels $28_1$-$28_{10}$ rolling on its inner side 25.

More particularly, in this embodiment, the wheel guide 52 comprises a pair of guide projections $56_1$, $56_2$ that project on the inner side 25 of the endless track 22. Each guide projection $56_i$ (i=1 or 2) comprises a top end 57, a base 58, and a pair of wheel-facing sides 60, 62 opposite one another and extending downwardly from the top end 57.

The wheel-facing side 60 of each guide projection $56_i$ faces the drive wheel 24 and the idler wheels 26, 29 as these wheels pass between the guide projections $56_1$, $56_2$.

The wheel-facing side 62 of each guide projection $56_i$ faces respective ones of the roller wheels $28_1$-$28_{10}$ as they pass next to that guide projection. In this case, the wheel-facing side 62 of the guide projection $56_1$ faces the roller wheels $28_1$-$28_5$, while the wheel-facing side 62 of the guide projection $56_2$ faces the roller wheels $28_6$-$28_{10}$.

For ease of reference, the wheel-facing side 62 of the guide projection $56_1$ will be further discussed below, with an understanding that, in this embodiment, the wheel-facing side 62 of the guide projection $56_2$ is similarly designed.

Figure 9:
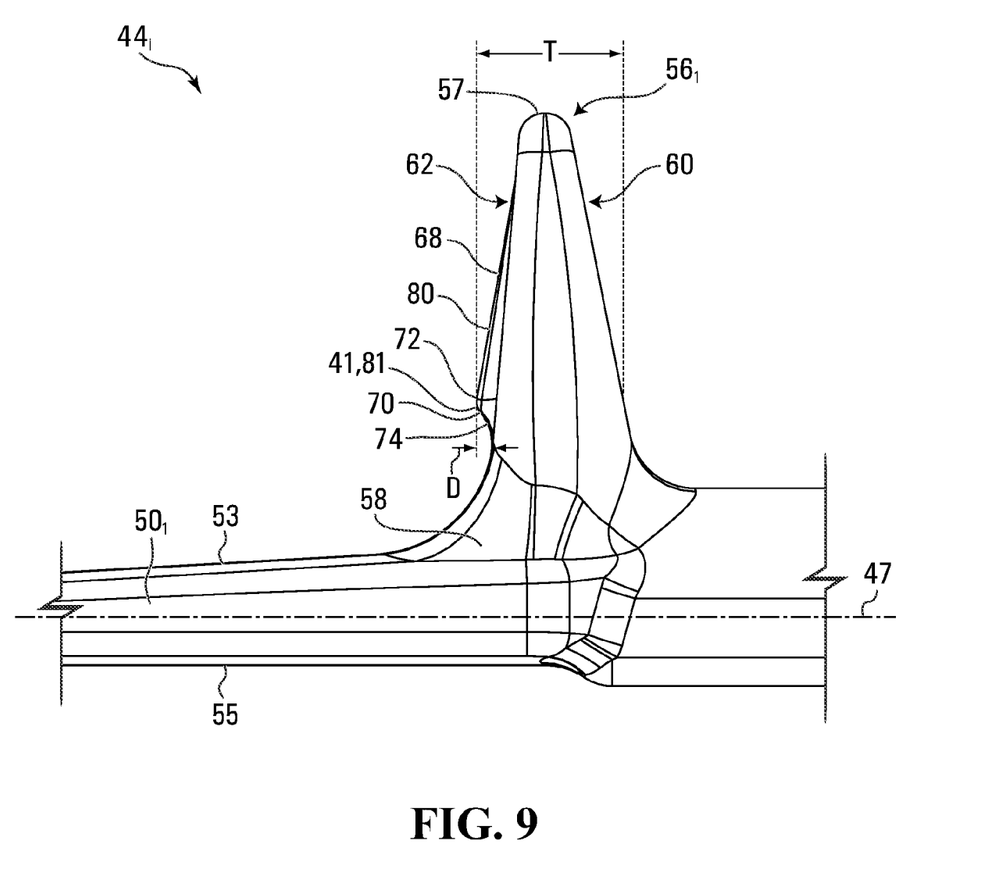
FIG. 9 shows an enlarged front view of part of the core shown in FIGS. 4 to 7.
Figure 10:
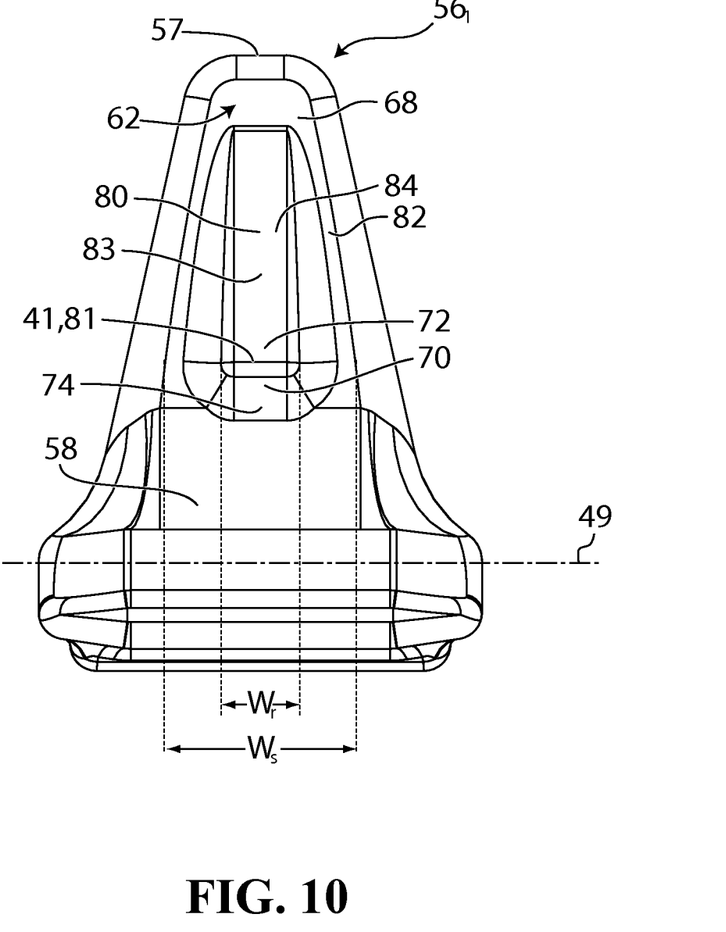
FIG. 10 shows an enlarged side view of the core shown in FIGS. 4 to 7.

The wheel-facing side 62 of the guide projection $56_1$ comprises an upper surface 68 and a lower surface 70. The lower surface 70 recedes inwardly from the upper surface 68 to form a recess 74. As will be further discussed, in this embodiment, as a portion of the elastomeric material 42 covering the upper surface 68 is worn out under action of the roller wheels $28_1$-$28_5$, the lower surface 70 impedes passage of grit between itself and an adjoining portion of the elastomeric material 42, thereby enhancing a wear resistance of the endless track 22.

Figure 8:
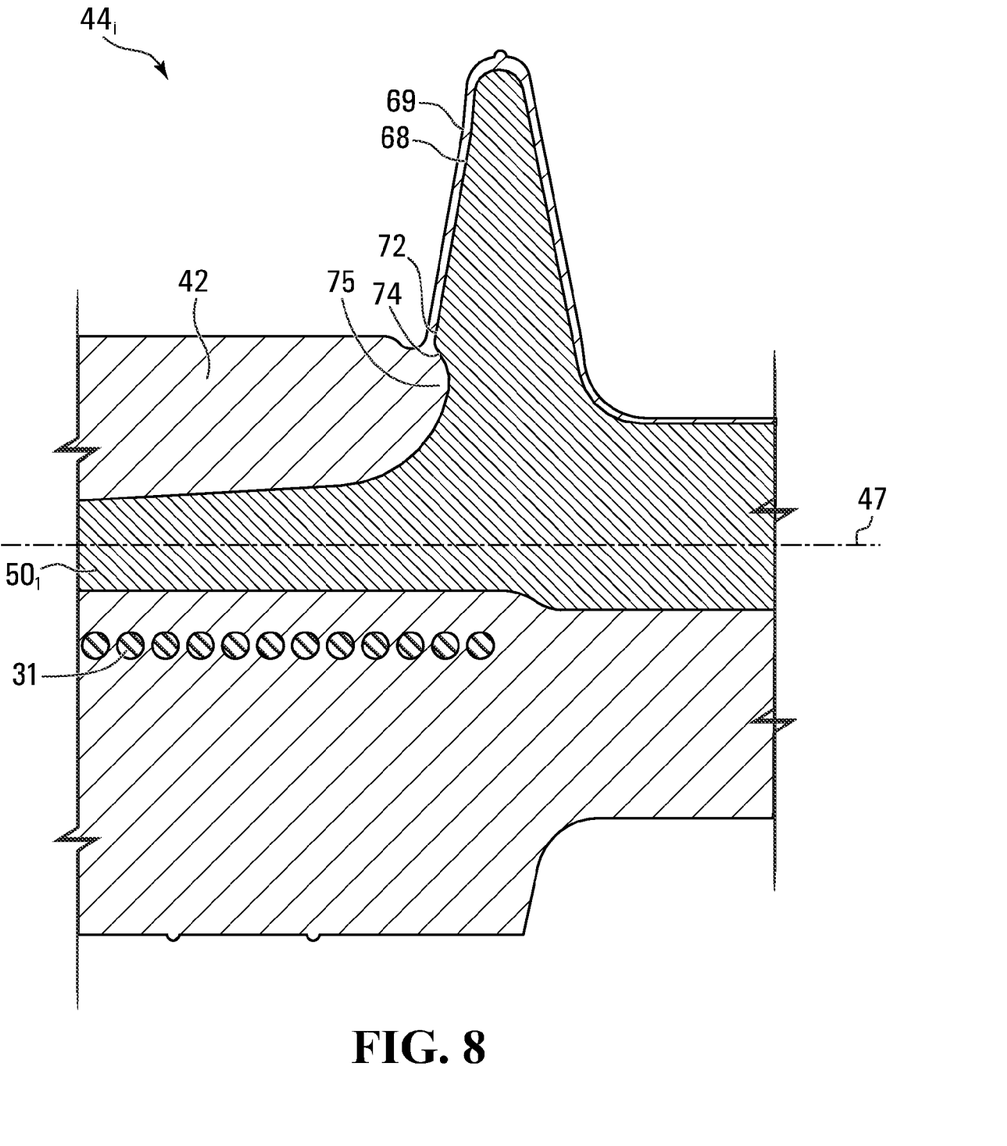
FIG. 8 shows an enlarged cross-sectional view of part of the endless track.

More specifically, in this embodiment, the endless track 22 is manufactured such that, when new, a portion 69 of the elastomeric material 42 covers the upper surface 68 of the guide projection $56_1$. The portion 69 is a relatively thin layer of elastomeric material which is expected to wear out relatively quickly as the roller wheels $28_1$-$28_5$ roll on the rolling surface $30_1$ of the inner side 25 of the endless track 22. Indeed, as they roll on the rolling surface $30_1$, the roller wheels $28_1$-$28_5$ may continuously or frequently apply pressure and/or frictional forces on the portion 69 of the elastomeric material 42 that can induce its wearing.

This wearing effect may be accelerated when grit, from the environment of the construction vehicle 10, lodges itself between the roller wheels $28_1$-$28_5$ and the portion 69 of the elastomeric material 42. Grit refers to rocks (e.g., gravel), sand, and/or other small granular abrasive objects. In some cases, grit may be contained in water and/or other liquid (e.g., oil) that forms grit-containing media.

As the wearing effect continues, some or all of the portion 69 of the elastomeric material 42 may be completely worn out, leaving at least part of the upper surface 68 of the guide projection $56_1$ exposed. With additional reference to FIG. 11, there is shown an example of a situation in which at least a portion of the upper surface 68, in this case, an entirety of the upper surface 68, has become exposed due to wearing out of the portion 69 of the elastomeric material 42 that originally covered it.

Figure 11:
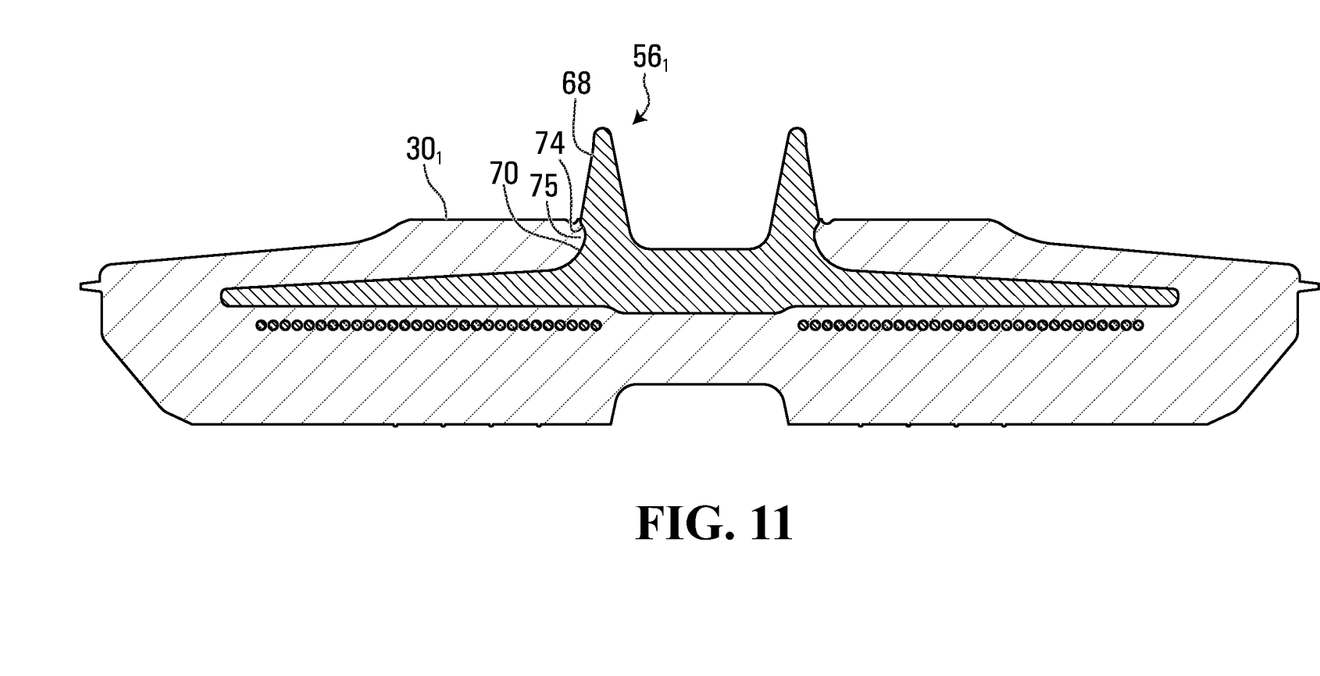
FIG. 11 shows a cross-sectional view of the endless track in a state in which some of the elastomeric material has worn out.

With the endless track 22 in this state, as they continue to roll on the rolling surface $30_1$, the roller wheels $28_1$-$28_5$ can contact the upper surface 68 of the guide projection $56_1$. The upper surface 68 of the guide projection $56_1$ can thus be viewed as a wheel-contacting surface, i.e., a surface designed to contact the roller wheels $28_1$-$28_5$.

In this state, the lower surface 70, which recedes inwardly from the upper surface 68 to form the recess 74, impedes passage of grit between the lower surface 70 and a portion 75 of the elastomeric material 42 adjoining the lower surface 70. In particular, while the upper surface 68 is contactable by (i.e., can contact) the roller wheels $28_1$-$28_5$, the lower surface 70 and the recess 74 it forms are uncontactable by (i.e., cannot contact) the roller wheels $28_1$-$28_5$. In other words, in this case, the lower surface 70 and the recess 74 it forms prevent the roller wheels $28_1$-$28_5$ from contacting the wheel-facing side 62 below a certain level, namely a top edge 41 of the recess 74, at which the lower surface 70 starts receding inwardly from the upper surface 68. This absence of contact between the roller wheels $28_1$-$28_5$ and the wheel-facing side 62 below the top edge 41 of the recess 74 makes it considerably more difficult for the roller wheels $28_1$-$28_5$ to push grit between the lower surface 70 and the portion 75 of the elastomeric material 42 adjoining the lower surface 70.

The lower surface 70 can thus be viewed as a sealing surface, i.e., a surface designed to prevent or at least limit passage of grit between itself and the adjoining portion 75 of the elastomeric material 42. This impediment to passage of grit slows down a rate of wear of the endless track 22, thereby helping to retain proper adhesion between the core $44_i$ and the elastomeric material 42.

More particularly, in this embodiment, the upper surface 68 defines an overhang 72 extending over the recess 74. The portion 75 of the elastomeric material 42 is in the recess 74 and protected by the overhang 72. The roller wheels $28_1$-$28_5$ are thus prevented from contacting the wheel-facing side 62 below the overhang 72.

In this example, the upper surface 68 is uneven in a widthwise direction of the core $44_i$, i.e., a direction parallel to a widthwise axis 49 of the core $44_i$, such that a first part 84 of the upper surface 68 extends further towards the roller wheels $28_1$-$28_5$ than a second part 82 of the upper surface 68. More particularly, in this example, the first part 84 of the upper surface 68 forms a protrusion 80 for contacting the roller wheels $28_1$-$28_4$. In this embodiment, the protrusion 80 is located in a central region of the upper surface 68, protrudes increasingly in a downward direction, includes a generally flat wheel-contacting face 83, and has a bottom edge 81 vertically spaced from the top surface 53 of the wing $50_1$ to define the overhang 72. The bottom edge 81 of the protrusion 80 corresponds to the top edge 41 of the recess 74.

The recess 74 has a depth D in a direction generally parallel to the longitudinal axis 47 of the core $44_i$. The depth D may take on various values to allow enhanced wear resistance while maintaining structural integrity of the guide projection $56_1$. For example, in some embodiments, when considering a thickness T of the guide projection $56_1$ in a direction generally parallel to the longitudinal axis 47 of the core $44_i$ at the top edge 41 of the recess 74, a ratio of the depth D to the thickness T may be at least 0.05, preferably at least 0.10, more preferably 0.20, and even more preferably at least 0.30. For instance, in some embodiments, the depth D may be at least 1 mm, preferably at least 5 mm, and more preferably at least 10 mm.

The recess 74 also has a width $W_r$ in a direction generally parallel to the widthwise axis 49 of the core $44_i$ at the top edge 41 of the recess 74. The width $W_r$ may take on various values. For example, in some embodiments, the width $W_r$ of the recess 74 may be at least one quarter, preferably at least one third, and more preferably at least one half of a width $W_s$ of the wheel-facing side 62 in a direction generally parallel to the widthwise axis 49 of the core $44_i$ at the top edge 41 of the recess 74.

Upon receding inwardly to form the recess 74, in this embodiment, the lower surface 70 of the guide projection $56_1$ extends outwardly to merge with the top surface 53 of the wing $50_1$.

It will thus be appreciated that, in this embodiment, the wheel-facing side 62 of each guide projection $56_i$ enhances the wear resistance of the endless track 22 by impeding passage of grit between its lower surface 70 and the portion 75 of the elastomeric material 42 adjoining its lower surface 70, thereby helping to retain proper adhesion between the core $44_i$ and the elastomeric material 42.

The endless track 22, including the cores $44_1$-$44_N$, may be configured in various other ways in other embodiments.

For example, in some embodiments, the endless track 22 may be manufactured such that, when new, the elastomeric material 42 does not cover some or all of the upper surface 68 of each guide projection $56_i$, which is rather exposed.

Figure 12:
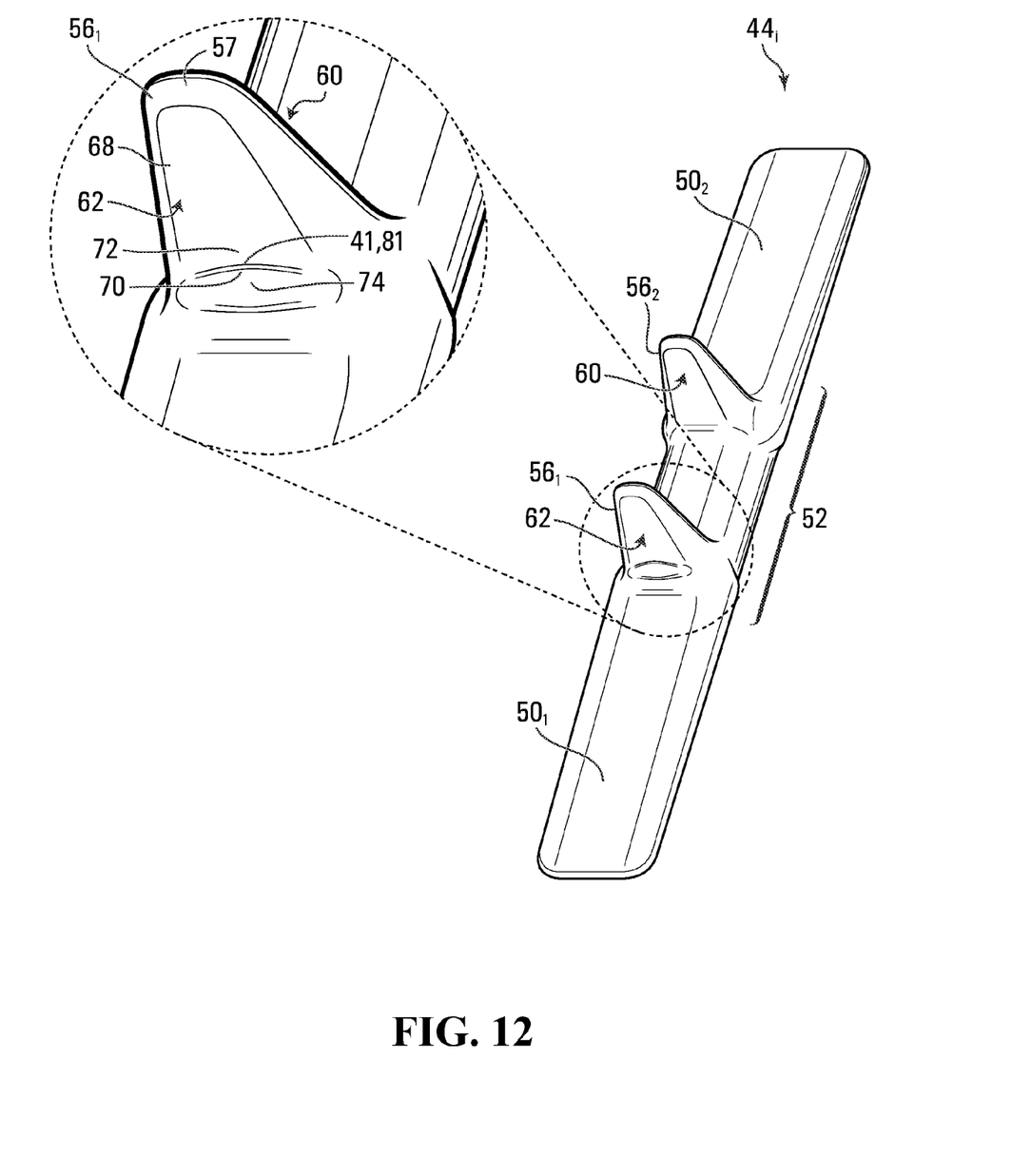
FIGS. 12 and 13 show a core in another embodiment of the invention.
Figure 13:
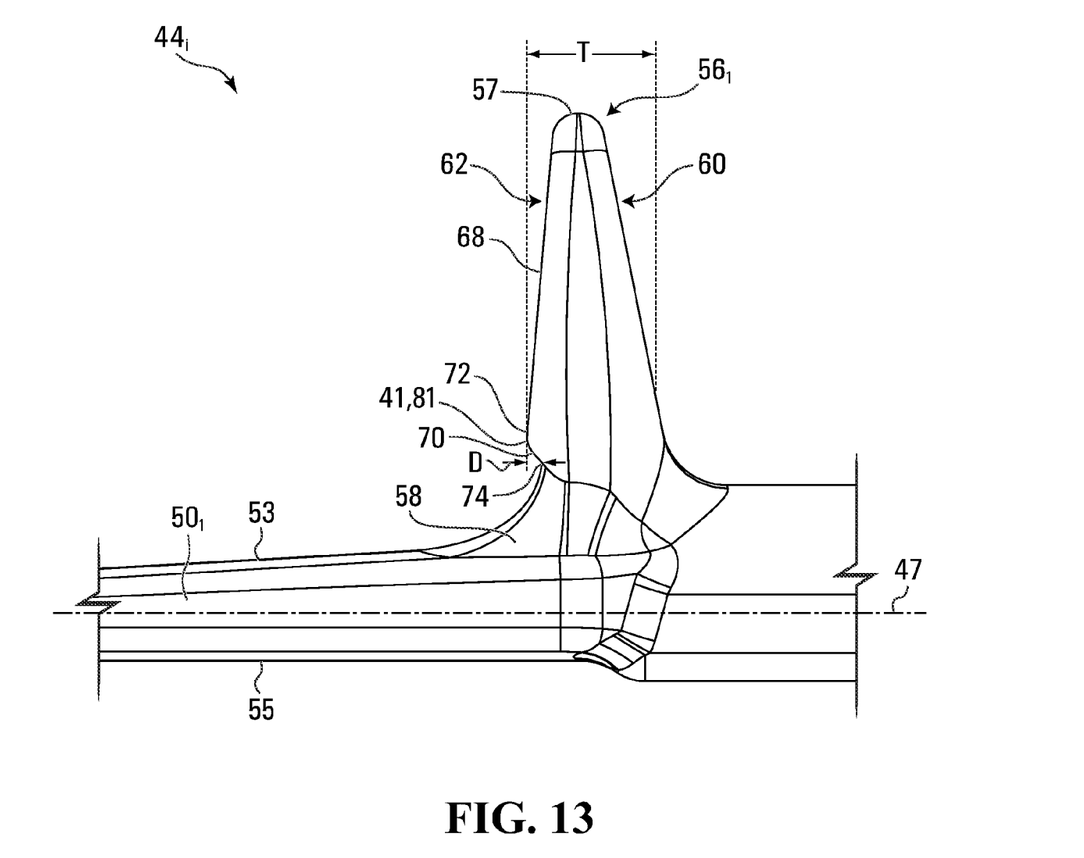

As another example, in other embodiments, the guide projections $56_1$, $56_2$ of the wheel guide 52 of each core $44_i$ may have various other configurations. In particular, the upper surface 68 and the lower surface 70 of the wheel-facing side 62 of each guide projection $56_i$ may be configured in various other ways. For instance, the recess 74 defined by the lower surface 70 may have various other shapes. Also, the protrusion 80 of the upper surface 68 may have a different shape or the upper surface 68 may not comprise any protrusion at all. For instance, FIGS. 12 and 13 show an example of an embodiment in which the guide projection $56_1$ does not comprise any protrusion on its upper surface 68 and in which its lower surface 70 and the recess 74 it forms have another shape.

As yet another example, in other embodiments, the construction vehicle 10 may comprise a different arrangement of roller wheels such as the roller wheels $28_1$-$28_{10}$ which may be such that the wheel-facing side 60 of each guide projection $56_i$, instead of or in addition to the wheel-facing side 62 of the guide projection $56_i$, faces roller wheels. In such embodiments, the wheel-facing side 60 may be configured as discussed previously in respect of the wheel-facing side 62.

As yet another example, in other embodiments, the wheel guide 52 of each core $44_i$ may comprise any number of guide projections (i.e., a single one, two, three or more) such as the guide projections $56_1$, $56_2$ that may be located at other positions along the longitudinal axis 47 of the core $44_i$.

Although in this embodiment the wheel-facing side 62 of the guide projections $56_1$, $56_2$ of each core $44_i$ enhances the wear resistance of the endless track 22 under action of the roller wheels $28_1$-$28_{10}$, in other embodiments, the wheel-facing side 60 and/or the wheel-facing side 62 of each of the guide projections $56_1$, $56_2$ may be similarly configured with a recess similar to the recess 74 in order to enhance the wear resistance of the endless track 22 under action of other wheels of the construction vehicle 10. For example, in some embodiments, the wheel-facing side 60 and/or the wheel-facing side 62 of each of the guide projections $56_1$, $56_2$ may have a recess similar to the recess 74 to impede passage of grit between that wheel-facing side and a portion of the elastomeric material in such a recess due to action of the drive wheel 24, the front idler wheel 26, and/or the rear idler wheel 29.

While in this embodiment the work vehicle 10 is a construction vehicle designed to perform construction work, in other embodiments, the work vehicle 10 may be an agricultural vehicle (e.g., a harvester, a combine, a tractor, etc.) designed to perform agricultural work, a forestry vehicle (e.g., a feller-buncher, a tree chipper, a knuckleboom loader, etc.) designed to perform forestry work, a military vehicle (e.g., a combat engineering vehicle (CEV)) designed to perform work in a military application, or any other work vehicle designed to perform another type of work (e.g., mining, geophysical surveying, etc.) in off-road conditions. In such embodiments, the work vehicle 10 may be equipped with various types of working implements depending on the nature of the work to be performed (e.g., a combine head for an agricultural vehicle, a mulching head for a forestry vehicle, etc.).

Although various embodiments and examples have been presented, this was for the purpose of describing, but not limiting, the invention. Various modifications and enhancements will become apparent to those of ordinary skill in the art and are within the scope of the invention, which is defined by the appended claims.

The embodiments of the invention in which an exclusive property or privilege is claimed are defined as follows:

1. An endless track for traction of a work vehicle, the endless track comprising a ground-engaging outer side for engaging the ground and an inner side for facing a plurality of wheels of the work vehicle, the plurality of wheels including a drive wheel for driving the endless track and a plurality of roller wheels for rolling on the inner side to apply a bottom run of the endless track onto the ground, the endless track comprising:
 a) a body of elastomeric material extending between the inner side and the ground-engaging outer side; and
 b) a plurality of cores at least partially embedded in the elastomeric material, each core of the plurality of cores comprising:

i. a pair of wings extending transversally to a longitudinal direction of the endless track; and ii. a wheel guide comprising a guide projection projecting on the inner side, the guide projection comprising a wheel-facing side for facing the plurality of roller wheels, the wheel-facing side comprising:

a wheel-contacting surface for contacting the plurality of roller wheels, the wheel-contacting surface being uneven in a widthwise direction of the core such that a first part of the wheel-contacting surface extends further towards the plurality of roller wheels than a second part of the wheel-contacting surface; and a sealing surface extending from the wheel-contacting surface and forming a recess to impede passage of grit between the wheel-facing side and a portion of the elastomeric material in the recess, the recess being narrower than the guide projection in the widthwise direction of the core.

2. The endless track claimed in claim 1, wherein the first part of the wheel-contacting surface forms a protrusion protruding from the second part of the wheel-contacting surface.

3. The endless track claimed in claim 2, wherein the recess extends from a bottom edge of the protrusion.

4. The endless track claimed in claim 2, wherein the protrusion protrudes increasingly in a direction towards a base of the guide projection.

5. The endless track claimed in claim 2, wherein the protrusion includes a generally flat wheel-contacting face.

6. The endless track claimed in claim 2, wherein the protrusion is located in a central region of the wheel-contacting surface in the widthwise direction of the core.

7. The endless track claimed in claim 1, wherein the recess has a depth in a longitudinal direction of the core, the guide projection has a thickness in the longitudinal direction of the core at a top edge of the recess, and a ratio of the depth of the recess to the thickness of the guide projection is at least 0.05.

8. The endless track claimed in claim 7, wherein the ratio of the depth of the recess to the thickness of the guide projection is at least 0.10.

9. The endless track claimed in claim 8, wherein the ratio of the depth of the recess to the thickness of the guide projection is at least 0.20.

10. The endless track claimed in claim 1, wherein the recess has a depth in a longitudinal direction of the core of at least 5 mm.

11. The endless track claimed in claim 10, wherein the depth of the recess is at least 10 mm.

12. The endless track claimed in claim 1, wherein the recess has a width in the widthwise direction of the core at a top edge of the recess, the wheel-facing side has a width in the widthwise direction of the core at the top edge of the recess, and the width of the recess is at least one-quarter of the width of the wheel-facing side.

13. The endless track claimed in claim 12, wherein the width of the recess is at least one-half of the width of the wheel-facing side.

14. The endless track claimed in claim 1, wherein, when the endless track is new, the wheel-contacting surface is at least partially covered by a portion of the elastomeric material expected to wear out as the plurality of roller wheels roll on the inner side and contact the guide projection.

15. The endless track claimed in claim 1, wherein the guide projection is a first guide projection and the plurality of roller wheels is a first plurality of roller wheels, the plurality of wheels of the work vehicle including a second plurality of roller wheels for rolling on the inner side to apply the bottom run of the endless track onto the ground, the wheel guide comprising a second guide projection projecting on the inner side and spaced apart from the first guide projection in a longitudinal direction of the core, the second guide projection comprising a wheel-facing side for facing the second plurality of roller wheels, the wheel-facing side of the second guide projection comprising:

a wheel-contacting surface for contacting the second plurality of roller wheels, the wheel-contacting surface of the second guide projection being uneven in the widthwise direction of the core such that a first part of the wheel-contacting surface of the second guide projection extends further towards the second plurality of roller wheels than a second part of the wheel-contacting surface of the second guide projection; and a sealing surface extending from the wheel-contacting surface of the second guide projection and forming a recess to impede passage of grit between the wheel-facing side of the second guide projection and a portion of the elastomeric material in the recess of the second guide projection.

16. The endless track claimed in claim 1, wherein the elastomeric material includes rubber.

17. A work vehicle comprising the endless track claimed in claim 1.

18. The work vehicle claimed in claim 17, wherein the work vehicle is a construction vehicle, an agricultural vehicle, a forestry vehicle or a military vehicle.

19. The endless track claimed in claim 1, wherein the recess prevents the plurality of roller wheels from contacting the wheel-facing side below a top edge of the recess.

20. The endless track claimed in claim 1, wherein the inner side comprises a rolling surface for supporting the plurality of roller wheels as the plurality of roller wheels roll on the inner side, the recess being located below the rolling surface.

21. A core for an endless track for traction of a work vehicle, the endless track comprising a ground-engaging outer side for engaging the ground and an inner side for facing a plurality of wheels of the work vehicle, the plurality of wheels including a drive wheel for driving the endless track and a plurality of roller wheels for rolling on the inner side to apply a bottom run of the endless track onto the ground, the endless track comprising a body of elastomeric material extending between the inner side and the ground-engaging outer side, the core being at least partially embeddable in the elastomeric material and comprising:

a) a pair of wings extending transversally to a longitudinal direction of the endless track when the core is in the endless track; and b) a wheel guide comprising a guide projection projecting on the inner side when the core is in the endless track, the guide projection comprising a wheel-facing side for facing the plurality of roller wheels, the wheel-facing side comprising:

a wheel-contacting surface for contacting the plurality of roller wheels, the wheel-contacting surface being uneven in a widthwise direction of the core such that a first part of the wheel-contacting surface extends further towards the plurality of roller wheels than a second part of the wheel-contacting surface; and a sealing surface extending from the wheel-contacting surface and forming a recess to impede passage of grit between the wheel-facing side and a portion of the elastomeric material in the recess when the core is in the endless track, the recess being narrower than the guide projection in the widthwise direction of the core.

22. An endless track for traction of a work vehicle, the endless track comprising a ground-engaging outer side for engaging the ground and an inner side for facing a plurality of wheels of the work vehicle, the plurality of wheels including a drive wheel for driving the endless track and a plurality of roller wheels for rolling on the inner side to apply a bottom run of the endless track onto the ground, the endless track comprising:
   a) a body of elastomeric material extending between the inner side and the ground-engaging outer side; and
   b) a plurality of cores at least partially embedded in the elastomeric material, each core of the plurality of cores comprising:
      i. a pair of wings extending transversally to a longitudinal direction of the endless track; and
      ii. a wheel guide comprising a guide projection projecting on the inner side, the guide projection comprising a wheel-facing side for facing the plurality of roller wheels, the wheel-facing side comprising:
         a wheel-contacting surface for contacting the plurality of roller wheels, the wheel-contacting surface forming a protrusion protruding from an adjacent part of the wheel-contacting surface; and
         a sealing surface extending from the wheel-contacting surface and forming a recess to impede passage of grit between the wheel-facing side and a portion of the elastomeric material in the recess, the recess being narrower than the guide projection in a widthwise direction of the core.

23. The endless track claimed in claim 22, wherein the recess extends from a bottom edge of the protrusion.

24. The endless track claimed in claim 22, wherein the protrusion protrudes increasingly in a direction towards a base of the guide projection.

25. The endless track claimed in claim 22, wherein the protrusion includes a generally flat wheel-contacting face.

26. The endless track claimed in claim 22, wherein the recess has a depth in a longitudinal direction of the core, the guide projection has a thickness in the longitudinal direction of the core at a top edge of the recess, and a ratio of the depth of the recess to the thickness of the guide projection is at least 0.05.

27. The endless track claimed in claim 26, wherein the ratio of the depth of the recess to the thickness of the guide projection is at least 0.10.

28. The endless track claimed in claim 27, wherein the ratio of the depth of the recess to the thickness of the guide projection is at least 0.20.

29. The endless track claimed in claim 22, wherein the recess has a depth in a longitudinal direction of the core of at least 5 mm.

30. The endless track claimed in claim 29, wherein the depth of the recess is at least 10 mm.

31. The endless track claimed in claim 22, wherein the recess has the width in a widthwise direction of the core at a top edge of the recess, the wheel-facing side has a width in the widthwise direction of the core at the top edge of the recess, and the width of the recess is at least one-quarter of the width of the wheel-facing side.

32. The endless track claimed in claim 31, wherein the width of the recess is at least one-half of the width of the wheel-facing side.

33. The endless track claimed in claim 22, wherein, when the endless track is new, the wheel-contacting surface is at least partially covered by a portion of the elastomeric material expected to wear out as the plurality of roller wheels roll on the inner side and contact the guide projection.

34. The endless track claimed in claim 22, wherein the guide projection is a first guide projection and the plurality of roller wheels is a first plurality of roller wheels, the plurality of wheels of the work vehicle including a second plurality of roller wheels for rolling on the inner side to apply the bottom run of the endless track onto the ground, the wheel guide comprising a second guide projection projecting on the inner side and spaced apart from the first guide projection in a longitudinal direction of the core, the second guide projection comprising a wheel-facing side for facing the second plurality of roller wheels, the wheel-facing side of the second guide projection comprising:
   a wheel-contacting surface for contacting the second plurality of roller wheels, the wheel-contacting surface of the second guide projection forming a protrusion protruding from an adjacent part of the wheel-contacting surface of the second guide projection; and
   a sealing surface extending from the wheel-contacting surface of the second guide projection and forming a recess to impede passage of grit between the wheel-facing side of the second guide projection and a portion of the elastomeric material in the recess of the second guide projection.

35. The endless track claimed in claim 22, wherein the elastomeric material includes rubber.

36. A work vehicle comprising the endless track claimed in claim 22.

37. The work vehicle claimed in claim 36, wherein the work vehicle is a construction vehicle, an agricultural vehicle, a forestry vehicle or a military vehicle.

38. The endless track claimed in claim 22, wherein the recess prevents the plurality of roller wheels from contacting the wheel-facing side below a top edge of the recess.

39. The endless track claimed in claim 22, wherein the protrusion is located in a central region of the wheel-contacting surface in a widthwise direction of the core.

40. The endless track claimed in claim 22, wherein the inner side comprises a rolling surface for supporting the plurality of roller wheels as the plurality of roller wheels roll on the inner side, the recess being located below the rolling surface.

41. A core for an endless track for traction of a work vehicle, the endless track comprising a ground-engaging outer side for engaging the ground and an inner side for facing a plurality of wheels of the work vehicle, the plurality of wheels including a drive wheel for driving the endless track and a plurality of roller wheels for rolling on the inner side to apply a bottom run of the endless track onto the ground, the endless track comprising a body of elastomeric material extending between the inner side and the ground-engaging outer side, the core being at least partially embeddable in the elastomeric material and comprising:
   a) a pair of wings extending transversally to a longitudinal direction of the endless track when the core is in the endless track; and
   b) a wheel guide comprising a guide projection projecting on the inner side when the core is in the endless track, the guide projection comprising a wheel-facing side for facing the plurality of roller wheels, the wheel-facing side comprising:
      a wheel-contacting surface for contacting the plurality of roller wheels, the wheel-contacting surface forming a protrusion protruding from an adjacent part of the wheel-contacting surface; and
      a sealing surface extending from the wheel-contacting surface and forming a recess to impede passage of grit between the wheel-facing side and a portion of the elastomeric material in the recess when the core is in the endless track, the recess being narrower than the guide projection in a widthwise direction of the core.

42. An endless track for traction of a vehicle, the endless track comprising a ground-engaging outer side for engaging the ground and an inner side for facing a plurality of wheels of the vehicle, the plurality of wheels including a drive wheel for driving the endless track and a plurality of roller wheels for rolling on the inner side to apply a bottom run of the endless track onto the ground, the endless track comprising:
 a) a body of elastomeric material extending between the inner side and the ground-engaging outer side; and
 b) a plurality of cores at least partially embedded in the elastomeric material, each core of the plurality of cores comprising:
  i. a pair of wings extending transversally to a longitudinal direction of the endless track; and
  ii. a wheel guide comprising a guide projection projecting on the inner side, the guide projection comprising a wheel-facing side for facing the plurality of roller wheels, the wheel-facing side comprising a recess configured to prevent the plurality of roller wheels from contacting a portion of the wheel-facing side extending below a top of the recess and along at least a majority of a dimension of the wheel-facing side in the widthwise direction of the core below the top of the recess, the recess being narrower than the guide projection in the widthwise direction of the core.

43. The endless track claimed in claim 42, wherein the wheel-facing side comprises a wheel-contacting surface above the recess and uneven in the widthwise direction of the core such that a given part of the wheel-contacting surface extends further towards the plurality of roller wheels than an adjacent part of the wheel-contacting surface.

44. The endless track claimed in claim 43, wherein the given part of the wheel-contacting surface forms a wheel-contacting protrusion protruding from the adjacent part of the wheel-contacting surface.

45. The endless track claimed in claim 44, wherein the wheel-contacting protrusion protrudes increasingly in a direction towards a base of the guide projection.

46. The endless track claimed in claim 44, wherein the wheel-contacting protrusion includes a generally flat wheel-contacting face.

47. The endless track claimed in claim 44, wherein the wheel-contacting protrusion is substantially centered in the wheel-facing side in the widthwise direction of the core.

48. The endless track claimed in claim 42, wherein the recess has a depth in a longitudinal direction of the core, the guide projection has a thickness in the longitudinal direction of the core at the top of the recess, and a ratio of the depth of the recess to the thickness of the guide projection is at least 0.05.

49. The endless track claimed in claim 48, wherein the ratio of the depth of the recess to the thickness of the guide projection is at least 0.10.

50. The endless track claimed in claim 49, wherein the ratio of the depth of the recess to the thickness of the guide projection is at least 0.20.

51. The endless track claimed in claim 42, wherein the recess has a depth in a longitudinal direction of the core of at least 5 mm.

52. The endless track claimed in claim 51, wherein the depth of the recess is at least 10 mm.

53. The endless track claimed in claim 42, wherein a width of the recess in the widthwise direction of the core is at least one-quarter of a width of the wheel-facing side in the widthwise direction of the core at the top of the recess.

54. The endless track claimed in claim 53, wherein the width of the recess is at least one-third of the width of the wheel-facing side.

55. The endless track claimed in claim 54, wherein the width of the recess is at least one-half of the width of the wheel-facing side.

56. The endless track claimed in claim 42, wherein, when the endless track is new, the guide projection is at least partially covered by a portion of the elastomeric material expected to wear out as the plurality of roller wheels roll on the inner side and contact the guide projection.

57. The endless track claimed in claim 42, wherein the guide projection is a first guide projection and the plurality of roller wheels is a first plurality of roller wheels, the plurality of wheels of the vehicle including a second plurality of roller wheels for rolling on the inner side to apply the bottom run of the endless track onto the ground, the wheel guide comprising a second guide projection projecting on the inner side and spaced apart from the first guide projection in a longitudinal direction of the core, the second guide projection comprising a wheel-facing side for facing the second plurality of roller wheels, the wheel-facing side of the second guide projection comprising a recess configured to prevent the second plurality of roller wheels from contacting a portion of the wheel-facing side of the second guide projection extending below a top of the recess of the second guide projection and along at least a majority of a dimension of the wheel-facing side of the second guide projection in the widthwise direction of the core below the top of the recess of the second guide projection, the recess of the second guide projection being narrower than the second guide projection in the widthwise direction of the core.

58. The endless track claimed in claim 42, wherein the recess is configured to prevent the plurality of roller wheels from contacting the wheel-facing side below the top of the recess.

59. The endless track claimed in claim 42, wherein a width of the recess in the widthwise direction of the core is less than half of a width of the guide projection in the widthwise direction of the core at the top of the recess.

60. The endless track claimed in claim 42, wherein the inner side comprises a rolling surface for supporting the plurality of roller wheels as the plurality of roller wheels roll on the inner side, the recess being located below the rolling surface.

61. An endless track for traction of a vehicle, the endless track comprising a ground-engaging outer side for engaging the ground and an inner side for facing a plurality of wheels of the vehicle, the plurality of wheels including a drive wheel for driving the endless track and a plurality of roller wheels for rolling on the inner side to apply a bottom run of the endless track onto the ground, the endless track comprising:
 a) a body of elastomeric material extending between the inner side and the ground-engaging outer side; and
 b) a plurality of cores at least partially embedded in the elastomeric material, each core of the plurality of cores comprising:
  i. a pair of wings extending transversally to a longitudinal direction of the endless track; and
  ii. a wheel guide comprising a guide projection projecting on the inner side, the guide projection comprising a wheel-facing side for facing the plurality of roller wheels, the wheel-facing side comprising:
   an upper surface uneven in a widthwise direction of the core such that a given part of the upper surface extends further towards the plurality of roller wheels than an adjacent part of the upper surface; and a lower surface forming a recess, the recess being narrower than the guide projection in the widthwise direction of the core.

62. The endless track claimed in claim 61, wherein the given part of the upper surface forms a wheel-contacting protrusion protruding from the adjacent part of the upper surface.

63. The endless track claimed in claim 62, wherein the wheel-contacting protrusion protrudes increasingly in a direction towards a base of the guide projection.

64. The endless track claimed in claim 62, wherein the wheel-contacting protrusion includes a generally flat wheel-contacting face.

65. The endless track claimed in claim 62, wherein the wheel-contacting protrusion is substantially centered in the wheel-facing side in the widthwise direction of the core.

66. The endless track claimed in claim 61, wherein the recess has a depth in a longitudinal direction of the core, the guide projection has a thickness in the longitudinal direction of the core at a top of the recess, and a ratio of the depth of the recess to the thickness of the guide projection is at least 0.05.

67. The endless track claimed in claim 66, wherein the ratio of the depth of the recess to the thickness of the guide projection is at least 0.10.

68. The endless track claimed in claim 67, wherein the ratio of the depth of the recess to the thickness of the guide projection is at least 0.20.

69. The endless track claimed in claim 61, wherein the recess has a depth in a longitudinal direction of the core of at least 5 mm.

70. The endless track claimed in claim 69, wherein the depth of the recess is at least 10 mm.

71. The endless track claimed in claim 61, wherein a width of the recess in the widthwise direction of the core is at least one-quarter of a width of the wheel-facing side in the widthwise direction of the core at a top of the recess.

72. The endless track claimed in claim 71, wherein the width of the recess is at least one-third of the width of the wheel-facing side.

73. The endless track claimed in claim 72, wherein the width of the recess is at least one-half of the width of the wheel-facing side.

74. The endless track claimed in claim 61, wherein, when the endless track is new, the guide projection is at least partially covered by a portion of the elastomeric material expected to wear out as the plurality of roller wheels roll on the inner side and contact the guide projection.

75. The endless track claimed in claim 61, wherein the guide projection is a first guide projection and the plurality of roller wheels is a first plurality of roller wheels, the plurality of wheels of the vehicle including a second plurality of roller wheels for rolling on the inner side to apply the bottom run of the endless track onto the ground, the wheel guide comprising a second guide projection projecting on the inner side and spaced apart from the first guide projection in a longitudinal direction of the core, the second guide projection comprising a wheel-facing side for facing the second plurality of roller wheels, the wheel-facing side of the second guide projection comprising:

an upper surface uneven in a widthwise direction of the core such that a given part of the upper surface of the wheel-facing side of the second guide projection extends further towards the plurality of roller wheels than an adjacent part of the upper surface of the wheel-facing side of the second guide projection; and a lower surface forming a recess, the recess of the second guide projection being narrower than the second guide projection in the widthwise direction of the core.

76. The endless track claimed in claim 61, wherein the recess is configured to prevent the plurality of roller wheels from contacting the wheel-facing side below a top of the recess.

77. The endless track claimed in claim 61, wherein a width of the recess in the widthwise direction of the core is less than half of a width of the guide projection in the widthwise direction of the core at a top of the recess.

78. The endless track claimed in claim 61, wherein the inner side comprises a rolling surface for supporting the plurality of roller wheels as the plurality of roller wheels roll on the inner side, the recess being located below the rolling surface.

* * * * *